United States Patent
Bergman et al.

(10) Patent No.: US 9,021,816 B2
(45) Date of Patent: May 5, 2015

(54) GAS TURBINE ENGINE TURBINE VANE PLATFORM CORE

(75) Inventors: Russell J. Bergman, Windsor, CT (US); Leonard A. Bach, West Hartford, CT (US); Brandon W. Spangler, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 195 days.

(21) Appl. No.: 13/539,842

(22) Filed: Jul. 2, 2012

(65) Prior Publication Data

US 2014/0000285 A1   Jan. 2, 2014

(51) Int. Cl.

| | |
|---|---|
| *F02C 3/04* | (2006.01) |
| *F04D 29/30* | (2006.01) |
| *F01D 9/02* | (2006.01) |
| *F01D 9/04* | (2006.01) |
| *F01D 25/12* | (2006.01) |

(52) U.S. Cl.
CPC ... *F01D 9/02* (2013.01); *F01D 9/041* (2013.01); *F01D 25/12* (2013.01); *F05D 2230/21* (2013.01); *F05D 2240/81* (2013.01); *F05D 2260/2214* (2013.01); *Y02T 50/672* (2013.01); *Y02T 50/676* (2013.01)

(58) Field of Classification Search
USPC ........... 60/805, 806; 415/115, 116; 416/96 R, 416/97 R
See application file for complete search history.

(56) References Cited

U.S. PATENT DOCUMENTS

| | | | |
|---|---|---|---|
| 4,353,679 A * | 10/1982 | Hauser ......................... | 415/115 |
| 5,340,278 A | 8/1994 | Magowan | |
| 5,344,283 A | 9/1994 | Magowan et al. | |
| 5,813,835 A * | 9/1998 | Corsmeier et al. .......... | 416/97 R |
| 5,980,202 A * | 11/1999 | Tomita et al. ................. | 415/115 |
| 6,092,983 A * | 7/2000 | Tomita et al. ................. | 415/115 |
| 6,196,799 B1 * | 3/2001 | Fukue et al. ................. | 416/97 R |
| 6,210,111 B1 | 4/2001 | Liang | |
| 6,241,467 B1 * | 6/2001 | Zelesky et al. .............. | 415/115 |
| 7,144,220 B2 | 12/2006 | Marcin, Jr. | |
| 7,255,536 B2 | 8/2007 | Cunha et al. | |
| 7,708,525 B2 | 5/2010 | Cherolis et al. | |
| 8,016,546 B2 | 9/2011 | Surace et al. | |
| 2001/0005480 A1 * | 6/2001 | Yu et al. ........................ | 415/115 |
| 2001/0021343 A1 * | 9/2001 | Kuwabara et al. ............ | 415/115 |
| 2002/0172590 A1 * | 11/2002 | Sreekanth et al. ............ | 415/115 |

(Continued)

FOREIGN PATENT DOCUMENTS

| | | |
|---|---|---|
| EP | 0 702 748 | 3/1996 |
| EP | 1 013 880 | 3/2004 |

OTHER PUBLICATIONS

International Search Report & Written Opinion for PCT/US2013/044419 Completed Mar. 25, 2014.

*Primary Examiner* — Gerald L Sung
*Assistant Examiner* — Scott Walthour
(74) *Attorney, Agent, or Firm* — Carlson, Gaskey & Olds, P.C.

(57) ABSTRACT

A turbine vane for a gas turbine engine includes inner and outer platforms joined by a radially extending airfoil. The airfoil includes leading and trailing edges joined by spaced apart pressure and suction sides to provide an exterior airfoil surface. The airfoil includes an airfoil cooling passage. A platform cooling passage is arranged within at least one of the inner and outer platforms. The platform cooling passage includes multiple cooling regions with one of the cooling regions arranged beneath the airfoil cooling passage.

15 Claims, 5 Drawing Sheets

(56) References Cited

U.S. PATENT DOCUMENTS

| | | |
|---|---|---|
| 2005/0079060 A1* | 4/2005 | MacManus ................ 416/235 |
| 2006/0263221 A1 | 11/2006 | Cunha et al. |
| 2007/0189866 A1* | 8/2007 | Matzenmuller et al. ...... 407/120 |
| 2007/0189896 A1 | 8/2007 | Itzel et al. |
| 2007/0253816 A1* | 11/2007 | Walz et al. ................ 416/97 R |
| 2007/0258819 A1* | 11/2007 | Allen-Bradley et al. . 416/193 A |
| 2009/0116953 A1 | 5/2009 | Spangler et al. |
| 2010/0239432 A1* | 9/2010 | Liang ........................ 416/97 R |
| 2010/0322767 A1 | 12/2010 | Nadvit et al. |
| 2011/0123310 A1* | 5/2011 | Beattie et al. ................ 415/115 |
| 2011/0223004 A1* | 9/2011 | Lacy et al. ................... 415/115 |
| 2011/0236206 A1* | 9/2011 | Seely ................................. 416/1 |

* cited by examiner

GAS TURBINE ENGINE TURBINE VANE PLATFORM CORE

BACKGROUND

This disclosure relates to a gas turbine engine, and more particularly to turbine vane platform cooling arrangements that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

In turbine vane design, there is an emphasis on stress-resistant airfoil and platform designs, with reduced losses, increased lift and turning efficiency, and improved turbine performance and service life. The vane platforms include cooling features, such as film cooling holes that are supplied cooling fluid through platform cooling passages. The platform cooling passages may be provided by flat, serpentine-like ceramic core structures arranged within the platforms. The resultant platform cooling passages formed by the cores are intended to protect the vane platform from the hot combustion gases. Moreover, the cores have been contained in the portion of the platform aft of the airfoil such that the core does not pass beneath any significant portion of the airfoil's other cooling passages. To achieve desired platform cooling results, non-linear flow analyses and complex strain modeling are required, making practical results difficult to predict. Vane loading and temperature considerations also impose substantial design limitations, which cannot easily be generalized from one system to another.

SUMMARY

In one exemplary embodiment, a turbine vane for a gas turbine engine includes inner and outer platforms joined by a radially extending airfoil. The airfoil includes leading and trailing edges joined by spaced apart pressure and suction sides to provide an exterior airfoil surface. The airfoil includes an airfoil cooling passage. A platform cooling passage is arranged within at least one of the inner and outer platforms. The platform cooling passage includes multiple cooling regions with one of the cooling regions arranged beneath the airfoil cooling passage.

In a further embodiment of any of the above, the inner cooling passage includes a radially extending inlet.

In a further embodiment of any of the above, the cooling passage includes an axially extending portion terminating in a welded plug.

In a further embodiment of any of the above, the multiple cooling regions corresponds to first, second and third cooling regions providing a tortuous cooling passage. The first cooling region adjoins the inlet.

In a further embodiment of any of the above, an elongated rib is arranged near the inlet and separates the first and second cooling regions.

In a further embodiment of any of the above, the second cooling region is arranged beneath the airfoil and the first and third cooling regions are arranged outside of the airfoil.

In a further embodiment of any of the above, the at least one of the inner and outer platforms includes a platform perimeter having pressure side and aft edges. The second cooling region is generally parallel with the pressure side edge, and the third cooling region is generally parallel with the aft edge.

In a further embodiment of any of the above, at least one of the multiple cooling regions includes a cooling enhancement feature.

In a further embodiment of any of the above, the cooling enhancement feature is provided by trip strips.

In another exemplary embodiment, a gas turbine engine includes a compressor section. A combustor is fluidly connected to the compressor section. A turbine section is fluidly connected to the combustor. The turbine section includes a high pressure turbine coupled to the high pressure compressor via a shaft. The turbine section includes a low pressure turbine. The high pressure turbine includes an array of turbine vanes. Each turbine vane having inner and outer platforms are joined by a radially extending airfoil. The airfoil includes leading and trailing edges joined by spaced apart pressure and suction sides to provide an exterior airfoil surface. The airfoil includes an airfoil cooling passage. A platform core has a platform cooling passage arranged within at least one of the inner and outer platform. The platform cooling passage includes multiple cooling regions with one of the cooling regions arranged beneath the airfoil cooling passage.

In a further embodiment of any of the above, the array is a first stage array of turbine vanes.

In a further embodiment of any of the above, the first stage array of turbine vanes includes 32 turbine vanes.

In a further embodiment of any of the above, the high pressure turbine consists of two arrays of turbine blades and two arrays of fixed stator vanes.

In a further embodiment of any of the above, the inner cooling passage includes a radially extending inlet.

In a further embodiment of any of the above, the cooling passage includes an axially extending portion terminating in a welded plug.

In a further embodiment of any of the above, the multiple cooling regions corresponds to first, second and third cooling regions providing a tortuous cooling passage. The first cooling region adjoins the inlet.

In a further embodiment of any of the above, an elongated rib is arranged near the inlet and separates the first and second cooling regions.

In a further embodiment of any of the above, the second cooling region is arranged beneath the airfoil and the first and third cooling regions are arranged outside of the airfoil.

In a further embodiment of any of the above, the at least one of the inner and outer platforms includes a platform perimeter having pressure side and aft edges. The second cooling region is generally parallel with the pressure side edge, and the third cooling region is generally parallel with the aft edge.

In a further embodiment of any of the above, at least one of the multiple cooling regions includes a cooling enhancement feature.

In a further embodiment of any of the above, the cooling enhancement feature is provided by trip strips.

BRIEF DESCRIPTION OF THE DRAWINGS

The disclosure can be further understood by reference to the following detailed description when considered in connection with the accompanying drawings wherein.

DETAILED DESCRIPTION

Figure 1:
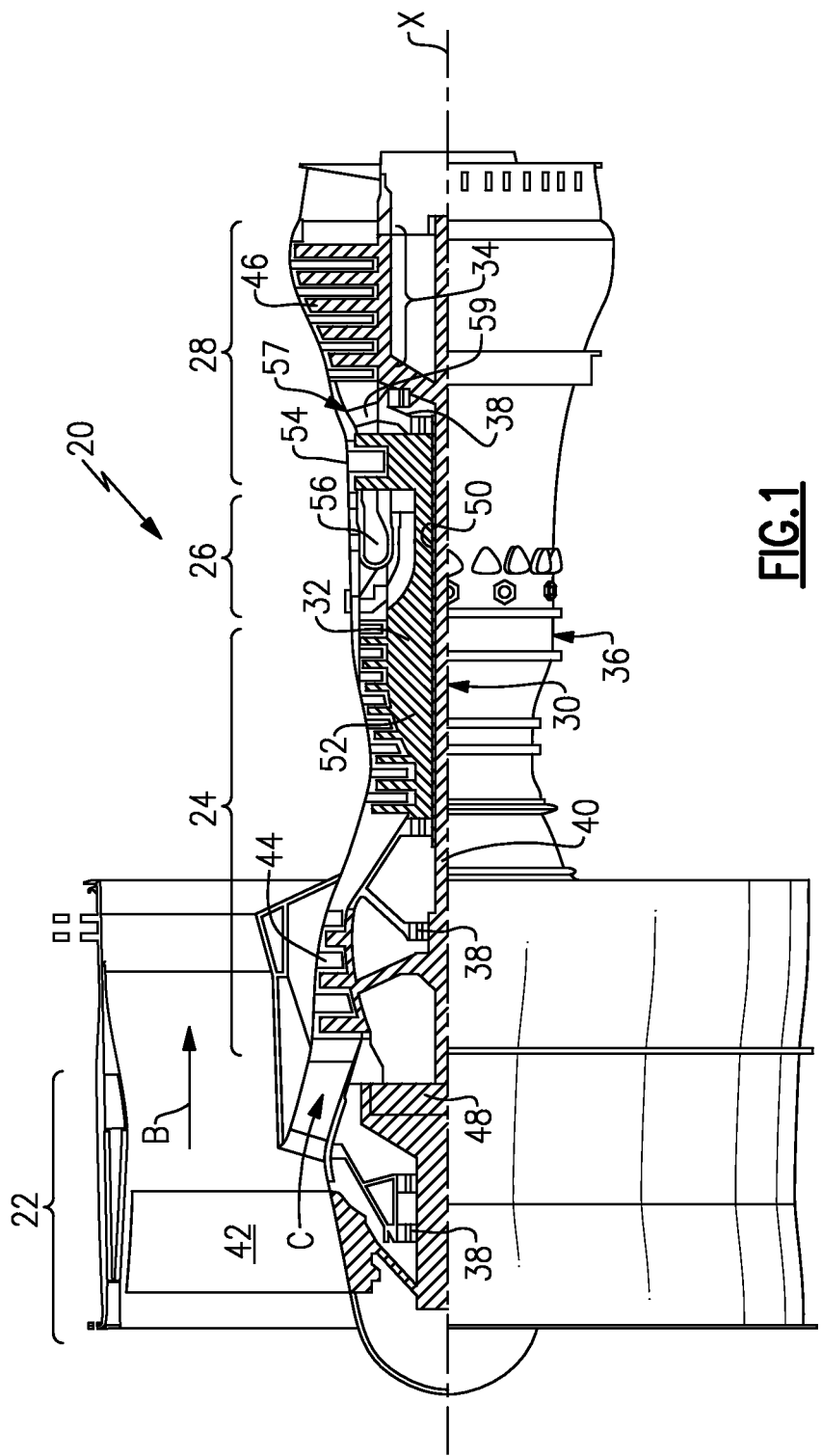
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/518.7)0.5]. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
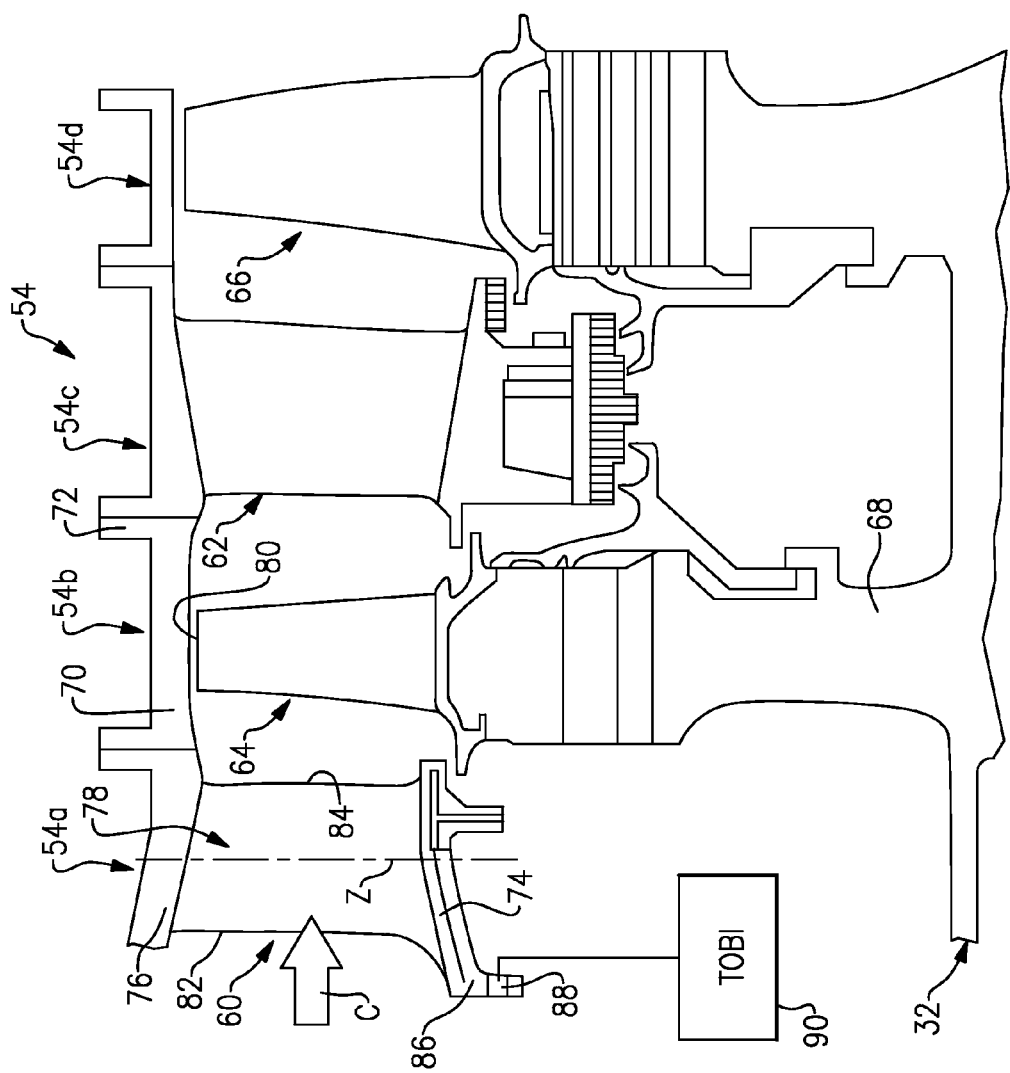
FIG. 2 is a cross-sectional view through a high pressure turbine section.

Referring to FIG. 2, a cross-sectional view through a high pressure turbine section 54 is illustrated. In the example high pressure turbine section 54, first and second arrays 54a, 54c of circumferentially spaced fixed vanes 60, 62 are axially spaced apart from one another. A first stage array 54b of circumferentially spaced turbine blades 64, mounted to a rotor disk 68, is arranged axially between the first and second fixed vane arrays 54a, 54c. A second stage array 54d of circumferentially spaced turbine blades 66 is arranged aft of the second array 54c of fixed vanes 62.

The turbine blades each include a tip 80 adjacent to a blade outer air seal 70 of a case structure 72. The first and second stage arrays 54a, 54c of turbine vanes and first and second stage arrays 54b, 54d of turbine blades are arranged within a core flow path C and are operatively connected to a spool 32.

Each vane 60 includes an inner platform 74 and an outer platform 76 respectively defining inner and outer flow paths. The platforms 74, 76 are interconnected by an airfoil 78 extending in a radial direction Z. It should be understood that the turbine vanes may be discrete from one another or arranged in integrated clusters. The airfoil 78 provides leading and trailing edges 82, 84. In the example, the inner platform 74 includes a radially inwardly extending tab 86 with a hole 88 that connects vane 78 to a tangential on-board injector (TOBI) structure 90. The TOBI structure 90 provides cooling fluid to the vane 60 and the blade array 54b.

Figure 6B:
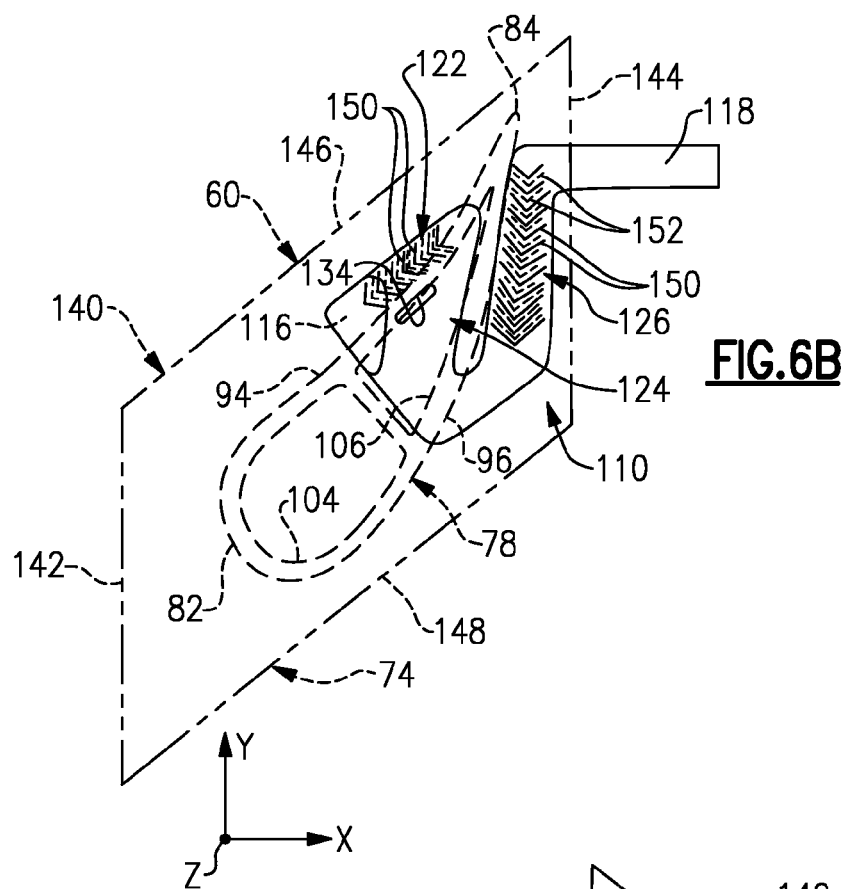
FIG. 6B is a top elevational view of the core platform and turbine vane shown in FIG. 6A.

The airfoil 78 is provided between pressure (concave) and suction (convex) sides 94, 96 in an airfoil thickness direction, which is generally perpendicular to a chord-wise direction provided between the leading and trailing edges 82, 84 (FIG. 6B). Multiple turbine vanes 60 are arranged circumferentially in a circumferential direction Y. The airfoil 78 typically includes multiple film cooling holes (not shown).

In one example, the first stage array 54a consists of 32 turbine vanes 60, but the number may vary according to engine size. The turbine vanes 60 are constructed from a high strength, heat resistant material such as a nickel-based or cobalt-based superalloy, or of a high temperature, stress resistant ceramic or composite material. In cooled configurations, internal fluid passages and external cooling apertures provide for a combination of impingement and film cooling. Other cooling approaches may be used such as trip strips, pedestals or other convective cooling techniques. In addition, one or more thermal barrier coatings, abrasion-resistant coatings or other protective coatings may be applied to the turbine vane 60.

Figure 3:
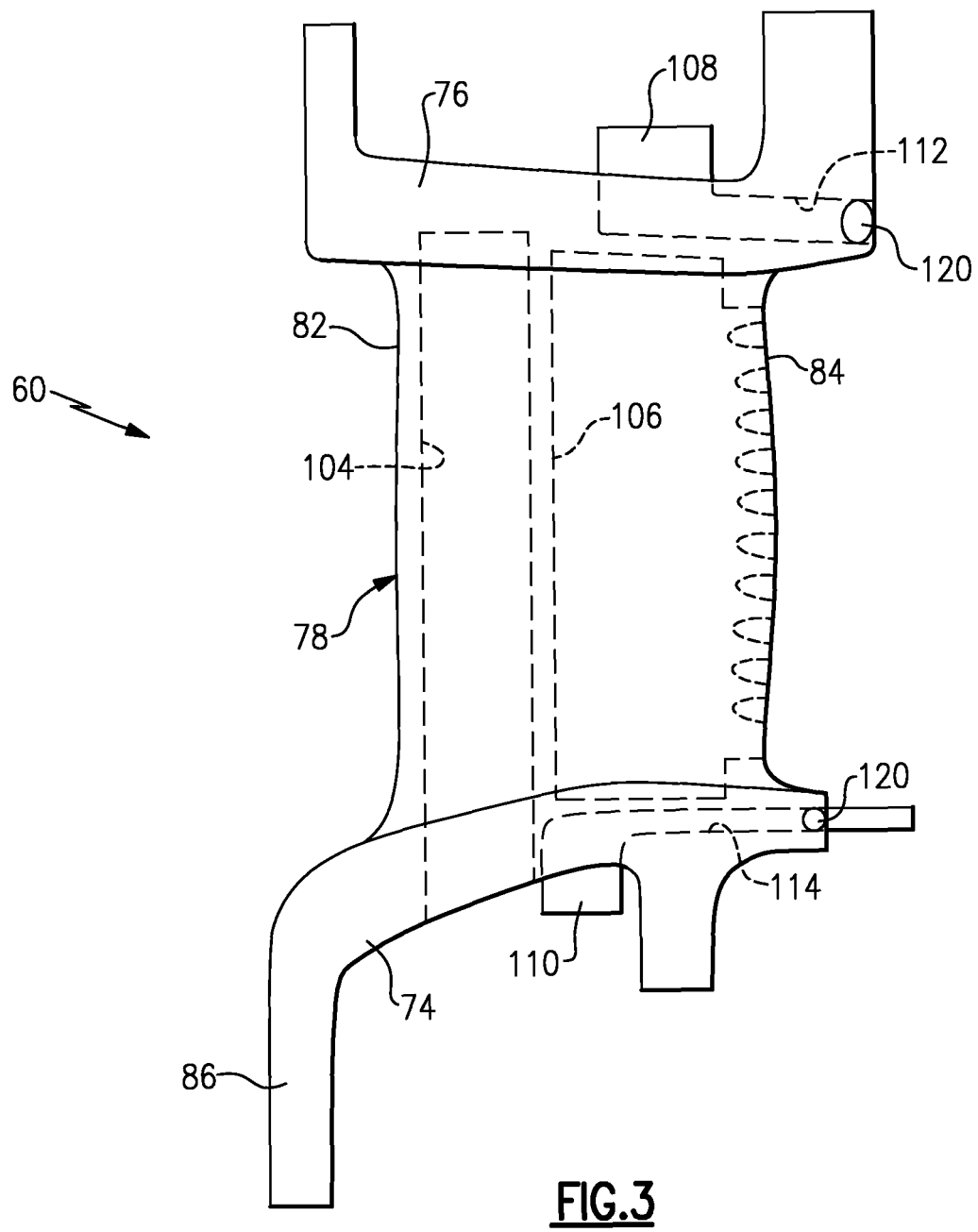
FIG. 3 is a perspective view of a turbine vane for the high pressure turbine section shown in FIG. 2.

Referring to FIG. 3, the turbine vane 60 typically includes at least several cooling passages supplied with cooling fluid from a cooling source. In one example, leading and trailing edge cooling passages 104, 106 extend radially within the airfoil 78. The inner platform 74 includes an inner platform cooling passage 114 formed by an inner platform core 110. Similarly, the outer platform 76 includes an outer platform cooling passage 112 formed by an outer platform core 108. Each of the outer and inner platform cooling passages 112, 114 typically include a welded plug 120 that seals the cooling passages subsequent to casting the turbine vane 60.

In one typical casting process, the cores are formed from ceramic. The coated cores are arranged in a wax mold and then encased in wax to provide a wax structure having the shape of the desired turbine vane. The wax structure is then coated with the ceramic slurry, and wax is melted from the dried ceramic slurry structure. The resulting hardened ceramic mold and cores provide the contours of the turbine vane and its cooling passages. Molten metal is poured into the ceramic mold, and the metal is permitted to cool. The hardened ceramic is then removed to reveal the rough turbine vane, which may be subsequently finish machined.

Figure 4:
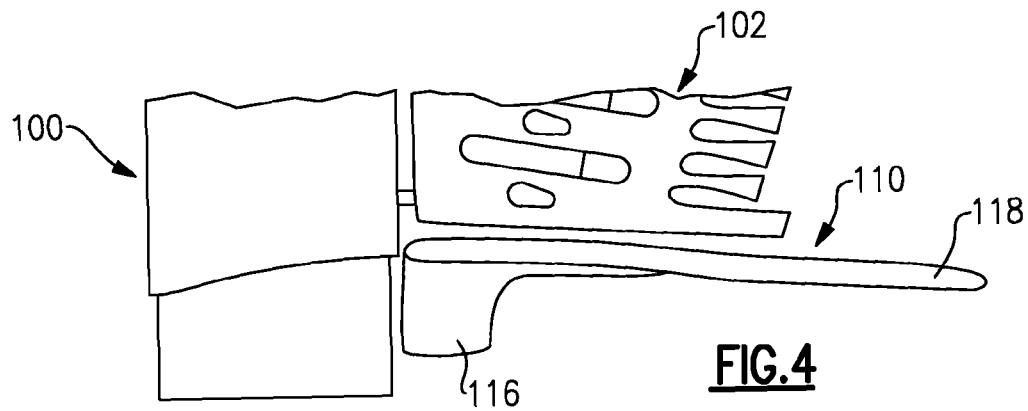
FIG. 4 is a side elevational view of a core assembly for the turbine vane shown in FIG. 3.

An inner portion of an example core assembly used to provide the cooling passages shown in FIG. 3 is illustrated in FIG. 4. Leading and trailing edge cooling passage cores 100, 102 provide a contour that forms the leading and trailing edge cooling passages 104, 106, respectively. The inner platform cooling passage 114 is provided by the inner platform core 110. The inner platform core 110 includes a radial core portion 116 and an axial core portion 118. The radial core portion 116 forms the inlet to the inner platform cooling passage 114. The opening formed in the inner platform 74 by the axial core portion 118 is blocked by the welded plug 120. In one example, the outer and inner platform cores 108, 110 are constructed from a ceramic or refractory metal, although other materials may also be used.

Figure 5A:
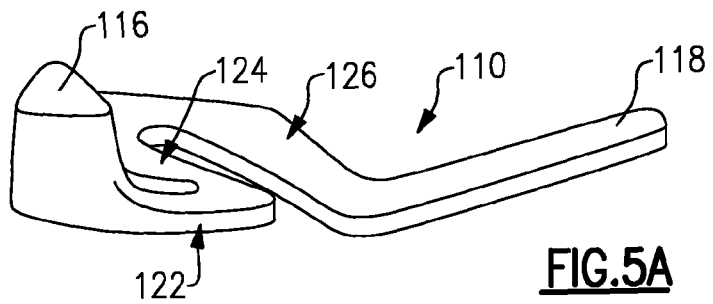
FIG. 5A is a perspective view of an inner platform core.
Figure 5B:
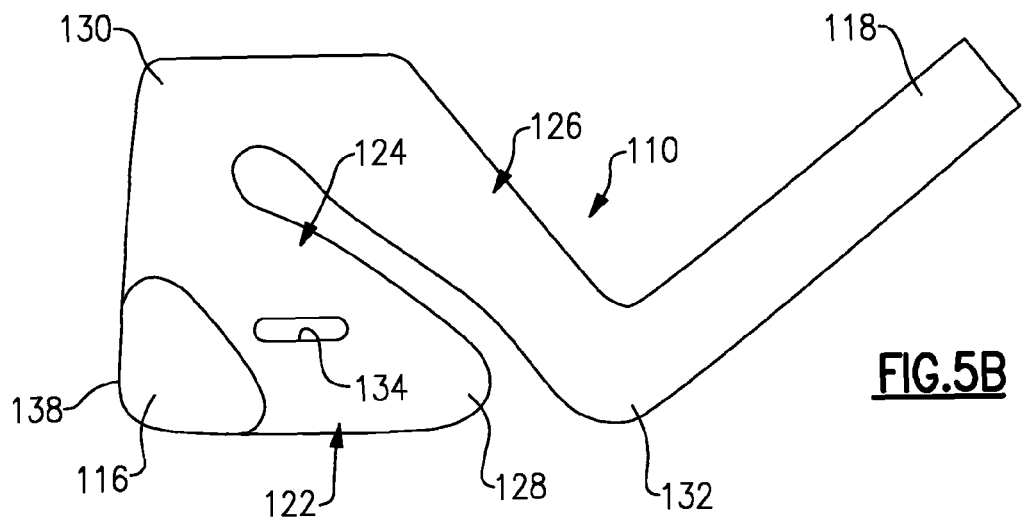
FIG. 5B is a bottom elevational view of the inner platform core shown in FIG. 5A.

Referring to FIGS. 5A and 5B, the inner platform core 110 includes first, second and third cooling regions 122, 124, 126 forming a correspondingly shaped serpentine-like tortuous path having first, second and third cooling regions. The first and second cooling regions 122, 124 are separated by an elongated slot 134 that provides a corresponding rib 136 (FIG. 6A) in the cast inner platform 74. In the example, the elongated slot 134 is spaced from the radial core portion 116, which prevents the flow from the inlet of the inner platform cooling passage 114 from becoming too restricted as it flows into the first cooling region 122. The radial core portion 116 is provided at a corner 138 that is generally a right angle in the example. The first and second cooling regions 122, 124 are joined by a first bend 128 that forms about a 45° angle. The second and third cooling regions 124, 126 are joined by a second bend 130 such that the inner platform cooling passage doubles back upon itself. The third cooling region 126 and the axial core portion 118 are joined at a third bend 132 such that the third cooling region 126 and axial core portion 118 are generally at a right angle to one another.

Figure 6A:
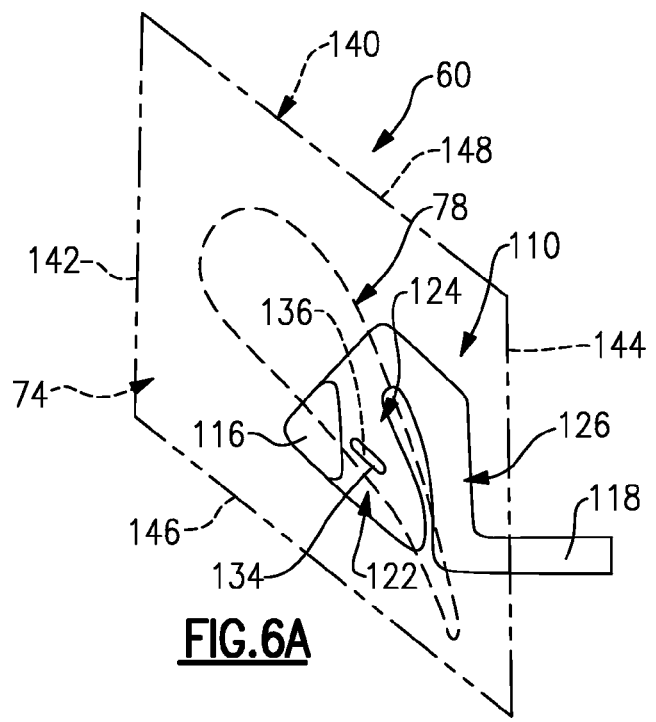
FIG. 6A is a bottom view of the inner core platform positioned relative to the turbine vane of FIG. 3, which is shown in phantom.

Referring to FIGS. 6A and 6B, the position of the inner platform core 110 relative to the turbine vane 60 is illustrated. Features of the turbine vane 60 are shown in phantom. The inner platform core 110 is positioned within a platform perimeter 140, which defines the inner platform 74. The inner platform core 110 is arranged at the aft portion of the platform 74. In one example, at least a portion of the inner platform core 110 is arranged radially beneath the entirety or near entirety of the trailing edge cooling passage 106. In the example, the inner platform core 110 does not extend beneath the leading edge cooling passage 104.

The inner platform perimeter 140 is provided by forward and aft edges 142, 144 joined to one another by pressure and suction side edges 146, 148. The axial core portion 118 is generally perpendicular to the aft edge 144, and the third cooling region 126 is generally parallel to the aft edge 144. The first cooling region 122 is generally parallel to the pressure side edge, and the elongated slot 134 is generally parallel to the pressure side edge 146. Arranging the axial core portion 118 in the axial direction better prevents the inner platform core 110 from cracking in the area of the second bend 130 during casting.

The first and third cooling regions 122, 126 include recesses 150 that provide corresponding trip strips 152 (dashed lines in FIG. 6B) in the cast inner platform 74. In the example, the recesses 150 are arranged to provide an apex to produce a chevron-shaped trip strip 152. The apex faces the cooling flow, forcing the cooling fluid outward within the cooling passage. These trip strips 152 further enhance cooling of the platform surface exposed to the core flow path C adjacent to the airfoil 78. The second cooling region 124, which is arranged beneath the trailing edge cooling passage 106 within the airfoil 78, does not include any cooling enhancement features, as such additional cooling is unnecessary.

Although an example embodiment has been disclosed, a worker of ordinary skill in this art would recognize that certain modifications would come within the scope of the claims. For example, although an inner platform core and associated inner platform cooling passage are described above, it should be understood that this disclosure may also be applied to an outer platform core and its associated cooling passage. For that reason, the following claims should be studied to determine their true scope and content.

What is claimed is:

1. A turbine vane for a gas turbine engine comprising:
   inner and outer platforms joined by an airfoil extending in a radial direction, the airfoil including leading and trailing edges spaced apart from one another in a chord-wise direction and joined by spaced apart pressure and suction sides to provide an exterior airfoil surface, the airfoil including an airfoil cooling passage; and
   a platform core having a platform cooling passage arranged within at least one of the inner and outer platforms, the platform cooling passage including multiple cooling regions with one of the cooling regions arranged beneath the airfoil cooling passage in the radial direction and aligned with the airfoil cooling passage in the chord-wise direction, wherein the platform cooling passage includes a radially extending inlet, wherein the multiple cooling regions corresponds to first, second and third cooling regions arranged to provide a tortuous route for cooling air flowing through the platform cooling passage, the first cooling region adjoining the inlet, and wherein an elongated rib is arranged near the inlet and is circumscribed by and separates the first and second cooling regions.

2. The turbine vane according to claim 1, wherein the platform cooling passage includes an axially extending portion terminating in a welded plug.

3. The turbine vane according to claim 1, wherein the second cooling region is arranged beneath the trailing edge in the radial direction and the first and third cooling regions are arranged outside of the airfoil.

4. The turbine vane according to claim 3, wherein the at least one of the inner and outer platforms includes a platform perimeter having pressure side and aft edges, the second cooling region generally parallel with the pressure side edge, and the third cooling region generally parallel with the aft edge.

5. The turbine vane according to claim 3, wherein at least one of the multiple cooling regions includes a cooling enhancement feature.

6. The turbine vane according to claim 5, wherein the cooling enhancement feature is provided by trip strips.

7. A gas turbine engine comprising:
   a compressor section;
   a combustor fluidly connected to the compressor section;
   a turbine section fluidly connected to the combustor, the turbine section comprising:
      a high pressure turbine coupled to the compressor section via a shaft;
      a low pressure turbine; and
   wherein the high pressure turbine includes an array of turbine vanes, each turbine vane having inner and outer platforms joined by an airfoil extending in a radial direction, the airfoil including leading and trailing edges spaced apart from one another in a chord-wise direction and joined by spaced apart pressure and suction sides to provide an exterior airfoil surface, the airfoil including an airfoil cooling passage; and
   a platform core having a platform cooling passage arranged within at least one of the inner and outer platforms, the platform cooling passage including multiple cooling regions with one of the cooling regions arranged beneath the airfoil cooling passage in the radial direction and aligned with the airfoil cooling passage in the chord-wise direction, wherein the platform cooling passage includes a radially extending inlet, wherein the multiple cooling regions corresponds to first, second and third cooling regions arranged to provide a tortuous route for cooling air flowing through the platform cooling passage, the first cooling region adjoining the inlet, and wherein an elongated rib is arranged near the inlet and is circumscribed by and separates the first and second cooling regions.

8. The gas turbine engine according to claim 7, wherein the array is a first stage array of turbine vanes.

9. The gas turbine engine according to claim 8, wherein the first stage array of turbine vanes includes 32 turbine vanes.

10. The gas turbine engine according to claim 9, wherein the high pressure turbine consists of two arrays of turbine blades and two arrays of fixed stator vanes.

11. The gas turbine engine according to claim 7, wherein the platform cooling passage includes an axially extending portion terminating in a welded plug.

12. The gas turbine engine according to claim 7, wherein the second cooling region is arranged beneath the trailing edge in the radial direction and the first and third cooling regions are arranged outside of the airfoil.

13. The gas turbine engine according to claim 12, wherein the at least one of the inner and outer platforms includes a platform perimeter having pressure side and aft edges, the second cooling region generally parallel with the pressure side edge, and the third cooling region generally parallel with the aft edge.

14. The gas turbine engine according to claim 12, wherein at least one of the multiple cooling regions includes a cooling enhancement feature.

15. The gas turbine engine according to claim 14, wherein the cooling enhancement feature is provided by trip strips.

* * * * *